US012598477B2

(12) United States Patent
Jeon

(10) Patent No.: US 12,598,477 B2
(45) Date of Patent: Apr. 7, 2026

(54) METHOD FOR DETERMINING LOCATION OF MOBILE BASE STATION

(71) Applicant: EUCAST CO., LTD., Gyeonggi-do (KR)

(72) Inventor: Hyung Joon Jeon, Gyeonggi-do (KR)

(73) Assignee: EUCAST CO., LTD. (KR)

( * ) Notice: Subject to any disclaimer, the term of this patent is extended or adjusted under 35 U.S.C. 154(b) by 917 days.

(21) Appl. No.: 17/756,092

(22) PCT Filed: Apr. 12, 2022

(86) PCT No.: PCT/KR2022/005280
§ 371 (c)(1),
(2) Date: Oct. 20, 2022

(87) PCT Pub. No.: WO2022/220542
PCT Pub. Date: Oct. 20, 2022

(65) Prior Publication Data
US 2024/0171989 A1 May 23, 2024

(30) Foreign Application Priority Data
Apr. 14, 2021 (KR) ........................ 10-2021-0048650

(51) Int. Cl.
*H04W 16/18* (2009.01)
(52) U.S. Cl.
CPC .................................. *H04W 16/18* (2013.01)
(58) Field of Classification Search
CPC ...... H04W 16/18; H04W 64/00; H04W 84/00
See application file for complete search history.

(56) References Cited

U.S. PATENT DOCUMENTS 8,798,638 B2 * 8/2014 Lane ..................... H04W 4/029
455/456.2
10,743,193 B2 * 8/2020 Shoshan ............. H04W 36/083
(Continued)

FOREIGN PATENT DOCUMENTS

CN 109581446 A * 4/2019 ............. G01S 19/42
JP 10-032869 A 2/2010
(Continued)

OTHER PUBLICATIONS

International Search Report from parent PCT/KR2022/005280. Oct. 20, 2022. 3 pages.
(Continued)

*Primary Examiner* — Yuwen Pan
*Assistant Examiner* — Swati Jain
(74) *Attorney, Agent, or Firm* — FisherBroyles, LLP; Craig W. Mueller

(57) ABSTRACT

Provided is a method for determining a placement location of at least one mobile base station, the method including setting a coverage area setting an initial location of the at least one mobile base station in the coverage area, obtaining location information of terminals in the coverage area, determining terminals to be connected to each of the at least one mobile base station, determining a location of each of the at least one mobile base station, determining whether the determined location is changed from a previous location determining the determined location as a placement location of each of the at least one mobile base station when the determined location is not changed from the previous location for every at least one mobile base station, as a result of the determining.

11 Claims, 4 Drawing Sheets

(56)          References Cited

U.S. PATENT DOCUMENTS

2019/0373067 A1 *  12/2019  Zheng ................... H04W 4/021
2022/0083070 A1 *   3/2022  Vogel ................... G05D 1/0234

FOREIGN PATENT DOCUMENTS

| KR | 10-2017-003044 | A |   | 3/2017  |           |
|----|----------------|---|---|---------|-----------|
| KR | 20170030442    | A | * | 3/2017  | H04W 24/04 |
| KR | 20170086300    | A | * | 7/2017  | H04W 64/003 |
| KR | 101790287      | B1 |  | 10/2017 |           |
| KR | 10-2018-004756 | A |   | 11/2019 |           |
| KR | 10-2017-008630 | A |   | 1/2021  |           |

OTHER PUBLICATIONS

Written Opinion from parent PCT/KR2022/005280. Oct. 20, 2022.
5 pages. Machine Translation from WIPO provided.

* cited by examiner

METHOD FOR DETERMINING LOCATION OF MOBILE BASE STATION

CROSS REFERENCE TO RELATED APPLICATION

This application is a national stage application under 35 U.S.C. 371 and claims the benefit of PCT Application No. PCT/KR2022/005280 having an international filing date of Apr. 12, 2022, which designated the United States, and which claims the benefit of Korean Patent Application No. 10-2021-0048650, filed Apr. 14, 2021, the entire contents of which is incorporated herein for all purposes by this reference.

BACKGROUND

Field

Various embodiments relate to a method for determining a real-time placement location of a mobile base station.

Description of the Related Art

A base station is a wireless communication device that connects a core network to a terminal to provide a wireless communication service. Generally, a base station connecting an access network of mobile communication such as Long Term Evolution (LTE), $5^{th}$-Generation (5G), etc., to a mobile phone is a representative example. A network connected for data communication between the base station and the core network is referred to as a backhaul.

Meanwhile, there is a growing demand for mobile base stations for disaster networks or military radio communication. A mobile base station may provide wireless communication within a military base while moving with the military base, or may be installed in an area where base station facilities are entirely lost due to a disaster.

SUMMARY

A location of a conventional fixed base station is fixed, whereas a location of a mobile base station may be changed. Thus, the mobile base station may find an optimal location for interference with neighboring base stations, distribution of terminals, etc., and move to the optimal location to provide a better service.

In view of the above, the present disclosure aims to provide a method for determining a location where a mobile base station is to be placed.

Technical problems to be solved herein are not limited to the above-mentioned technical problems, and other unmentioned technical problems may be clearly understood by those of ordinary skill in the art from the following description.

According to various embodiments of the present disclosure, a method for determining a placement location of at least one mobile base station includes (a) setting a coverage area in which a wireless communication service is provided by the at least one mobile base station, (b) setting an initial location of the at least one mobile base station in the coverage area, (c) obtaining location information of terminals in the coverage area, (d) determining terminals to be connected to each of the at least one mobile base station, (e) determining a location of each of the at least one mobile base station based on locations of the determined terminals to be connected, (f) determining whether the determined location is changed from a previous location for every one of the at least one mobile base station, and (g) repeating (d), (e), and (f) when the determined location is changed from the previous location for any one of the at least one mobile base station, as a result of the determining, and determining the determined location as a placement location of each of the at least one mobile base station when the determined location is not changed from the previous location for every one of the at least one mobile base station, as a result of the determining.

According to various embodiments of the present disclosure, the setting of the initial location of the at least one mobile base station in the coverage area may include dividing the coverage area into as many regions as a number of the at least one mobile base station, the regions having a same size and setting the initial location of the at least one mobile base station to a center of the region.

According to various embodiments of the present disclosure, the setting of the initial location of the at least one mobile base station in the coverage area may include dividing the coverage area into as many regions as a number of the at least one mobile base station, the regions having a same size and setting the initial location of the at least one mobile base station to a location of one of terminals included in the region.

According to various embodiments of the present disclosure, the determining of the terminals to be connected to each of the at least one mobile base station may include determining a mobile base station located closest to each terminal as a mobile base station to which the terminal is to be connected, based on the location of the at least one mobile base station.

According to various embodiments of the present disclosure, the determining of the location of each of the at least one mobile base station based on the locations of the determined terminals to be connected may include calculating a center value of the locations of the determined terminals to be connected, for each of the at least one mobile base station and determining a location corresponding to the calculated center value as the location of each of the at least one mobile base station.

According to various embodiments of the present disclosure, a method for determining a placement location of at least one mobile base station may include (a) setting a coverage area in which a wireless communication service is provided by the at least one mobile base station, (b) setting an initial location of the at least one mobile base station in the coverage area, (c) obtaining location information of terminals in the coverage area, (d) moving the at least one mobile base station to the initial location and obtaining information of terminals connected to each of the at least one mobile base station, (e) determining a location of each of the at least one mobile base station based on locations of the connected terminals, (f) moving the at least one mobile base station to the determined location and obtaining information of the connected terminals for each of the at least one mobile base station, (g) determining whether the connected terminals are changed for each of the at least one mobile base station, and (g) repeating (e), (f), and (g) when the connected terminals are changed compared to before for any one of the at least one mobile base station, as a result of the determining, and determining the determined location as a placement location of each of the at least one mobile base station when the connected terminals are not changed compared to before for every one of the at least one mobile base station, as a result of the determining.

According to various embodiments of the present disclosure, the setting of the initial location of the at least one mobile base station in the coverage area may include dividing the coverage area into as many regions as a number of the at least one mobile base station, the regions having a same size and setting the initial location of the at least one mobile base station to a center of the region.

According to various embodiments of the present disclosure, the setting of the initial location of the at least one mobile base station in the coverage area may include dividing the coverage area into as many regions as a number of the at least one mobile base station, the regions having a same size and setting the initial location of the at least one mobile base station to a location of one of terminals included in the region.

According to various embodiments of the present disclosure, the determining of the location of each of the at least one mobile base station based on the locations of the determined terminals to be connected may include calculating a center value of the locations of the determined terminals to be connected, for each of the at least one mobile base station and determining a location corresponding to the calculated center value as the location of each of the at least one mobile base station.

According to various embodiments of the present disclosure, the determining of whether the connected terminals are changed for each of the at least one mobile base station may include determining whether the connected terminals, except for a terminal entering an idle state after disconnecting from one of the at least one mobile base station and/or a terminal having location information that changes by a preset distance or more, are changed for each of the at least one mobile base station.

BRIEF DESCRIPTION OF THE DRAWINGS

With regard to the description of the drawings, identical or similar reference numerals may be used to refer to identical or similar components.

DETAILED DESCRIPTION OF THE INVENTION

Hereinafter, various embodiments will be described in detail with reference to the accompanying drawings.

Figure 1:
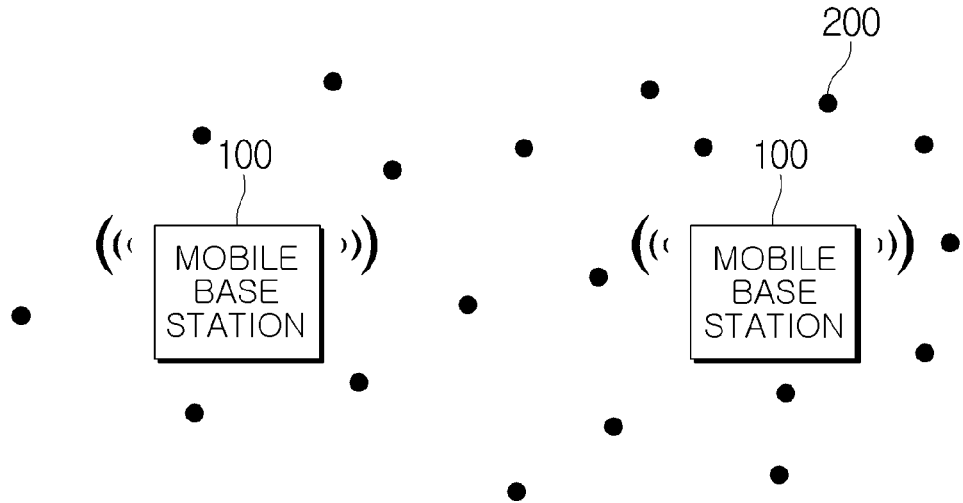
FIG. 1 illustrates an example of installation of a mobile base station.

FIG. 1 illustrates an example of installation of a mobile base station.

Referring to FIG. 1, a mobile base station 100 may be moved in real time by being mounted on a vehicle or by manpower, or may be placed in a particular location to provide a service for a specific time and then moved to another location. In this case, the mobile base station 100 may provide a wireless communication service to a plurality of terminals 200.

Since the terminals 200 to which each mobile base station 100 provides a service move in real time, a service environment may change in real time and the quality of the service provided by the mobile base station 100 may also change in real time.

In this case, the quality of the service may be improved by real-time movement of the mobile base station 100. However, movement of the mobile base station 100 may affect the service quality of all terminals connected to the mobile base station, it may not be reasonable to move the mobile base station 100 completely in real time. That is, the mobile base station 100 searching for an optimal location and moving to the found optimal location at some moment may provide a service in that location for a certain time, and preferably, may search for again an optimal location upon degradation of the quality of the service to some extent or at preset time intervals.

For example, when terminals are independently and uniformly distributed in a specific area and a mobile base station uses three omni-antennas, it may be optimal for the mobile base station to be located in the center of the specific area. However, since the terminals are not uniformly distributed, it is necessary to find the optimal location under given conditions.

Meanwhile, as described above, since the terminal 200 connected to the mobile base station 100 may also move, even though the optimal location is found at a certain moment, there is no guarantee that this location may be optimal at a next moment, such that the mobile base station 100 needs to periodically search for an optimal location and move to the optimal location, and to this end, the optimal location needs to be found using a method or algorithm that is not as complex as possible.

Therefore, the present disclosure proposes a system or algorithm for moving the mobile base station 100 to and placing the mobile base station 100 in a location where the quality of a periodically provided service may be optimal.

Figure 2:
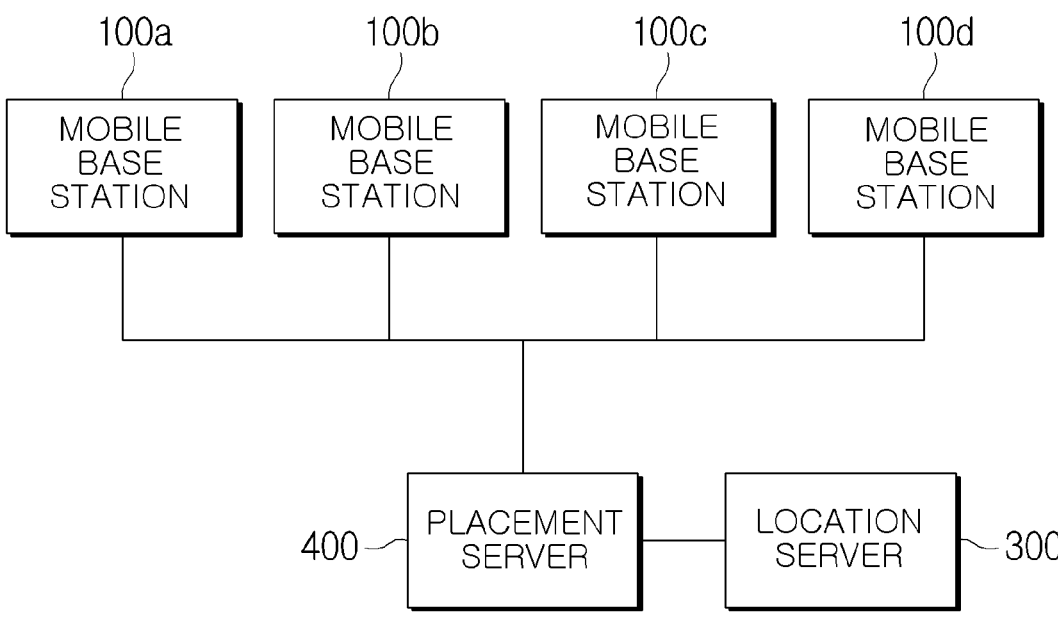
FIG. 2 illustrates a configuration of a mobile base station placement system, according to various embodiments.

FIG. 2 illustrates a configuration of a mobile base station placement system, according to various embodiments.

Referring to FIG. 2, the mobile base station placement system may include a placement server 400, a location server 300, and at least one mobile base station 100a to 100d.

The placement server 400 may be a server that includes at least one processor capable of executing an added algorithm by performing a typical computing function, a memory, and a network interface. The placement server 400 may determine a location where an optimal wireless communication service may be provided, for the at least one mobile base station 100a to 100d, and inform each mobile base station of the determined location to enable each mobile base station to move to the determined location.

The location server 300 may include location information of terminals that are connected to the at least one mobile base station 100a to 100d so as to receive a wireless communication service, and may provide the location information of terminals to the placement server 400. Although not described in the present disclosure, the location server 300 may obtain location information of each terminal based on atypical wireless communication standard protocol (e.g., an LTE standard protocol).

Figure 3:
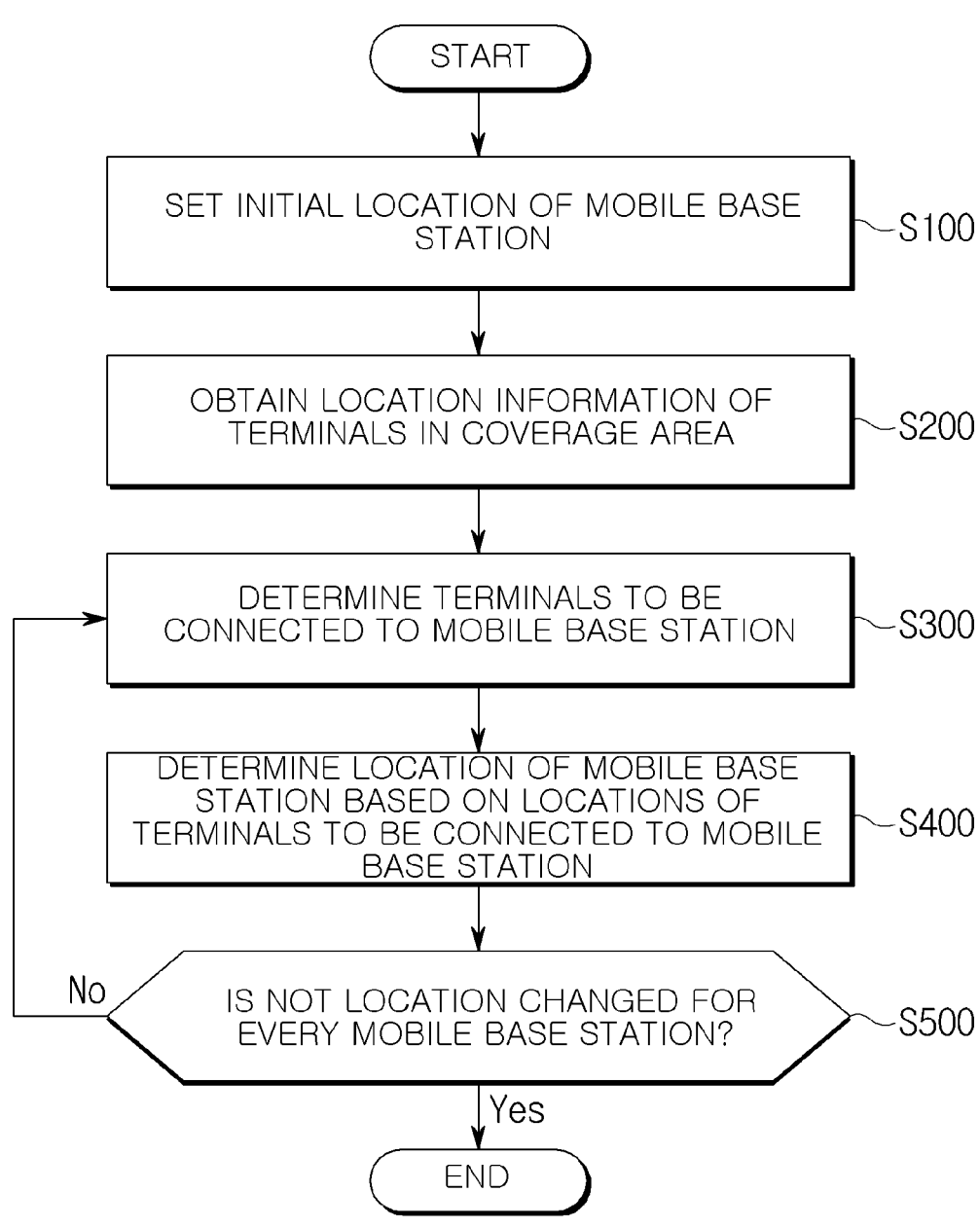
FIG. 3 is a flowchart of a first embodiment in which a placement server determines a location of at least one mobile base station.

FIG. 3 is a flowchart of a first embodiment in which the placement server 400 determines a location of the at least one mobile base station 100a to 100d.

Referring to FIG. 3, in operation S100, an initial location of a mobile base station may be set.

When a coverage area where a service is to be provided by the at least one mobile base station 100a to 100d has been determined, an initial location of the at least one mobile base station 100a to 100d may be set such that the at least one mobile base station 100a to 100d is at the same distance from each other in the coverage area.

Figure 4:
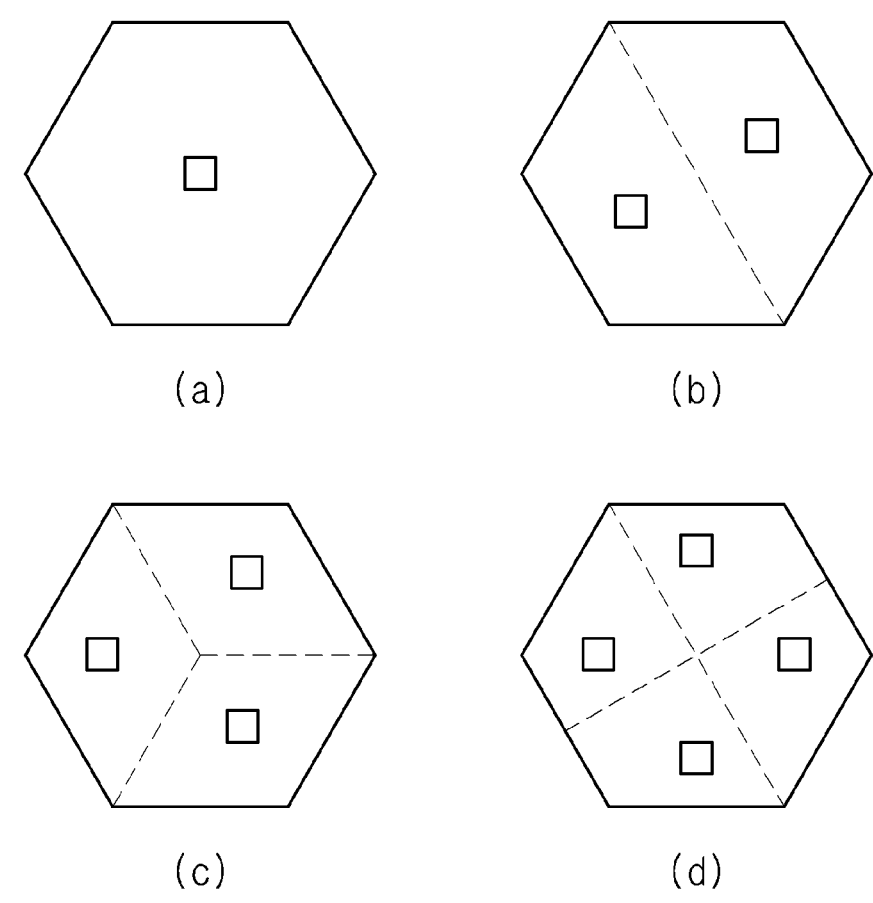
FIG. 4 illustrates examples where an initial location of at least one mobile base station is set.

FIG. 4 illustrates examples where an initial location of at least one mobile base station is set.

According to an embodiment, referring to (a) of FIG. 4, when the number of mobile base stations to be placed is 1, a center of a coverage area may be set to the initial location.

According to an embodiment, referring to (b) of FIG. 4, when the number of mobile base stations to be placed is 2, the coverage area may be divided into two regions and a center of each of the two regions may be set as each initial location. In an example embodiment, the two regions may have the same area Thus, the initial locations of the two mobile base stations may be 180 degrees with respect to each other.

According to an embodiment, referring to (c) of FIG. 4, when the number of mobile base stations to be placed is 3, the coverage area may be divided into three regions and a center of each of the three regions may be set as each initial location. In an example embodiment, the three regions may have the same area. Thus, the initial locations of the three mobile base stations may be 120 degrees with respect to one another.

According to an embodiment, referring to (d) of FIG. 4, when the number of mobile base stations to be placed is 4, the coverage area may be divided into four regions and a center of each of the four regions may be set as each initial location. In an example embodiment, the four regions may have the same area Thus, the initial locations of the four mobile base stations may be 90 degrees with respect to one another.

According to various embodiments, when the number of mobile base stations to be placed is n, the coverage area may be equally divided into n regions and a center of each of the n regions may be set as each initial location.

According to another embodiment, in the above-described embodiments, a random location in each region without being limited to the center of the region may be set as an initial location of each mobile base station.

According to another embodiment, the coverage area may be divided into regions having different random sizes rather than regions having the same size.

According to another embodiment, in the above-described embodiments, a location of one of terminals included in each region, instead of the center of each region, may be set as an initial location. For example, when the number of mobile base stations to be placed is n, the coverage area may be equally divided into n regions, and a location of one of terminals included in each of then regions may be selected and set as an initial location of each mobile base station for the region.

Referring back to FIG. 3, in operation S200, the placement server 400 may obtain location information of each of terminals in the coverage area where the service is to be provided by the at least one mobile base station 100a to 100d. According to an embodiment, the placement server 400 may obtain the location information of each of terminals from the location server 300.

According to an embodiment, operation S100 and operation S200 may be performed simultaneously or interchangeably.

In operation S300, the placement server 400 may determine terminals to be connected to a mobile base station so as to provide a service. According to an embodiment, the placement server 400 may determine terminals to be connected to each mobile base station, by determining a mobile base station located closest to each terminal as a mobile base station to which the terminal is to be connected, based on the initial location of the mobile base station determined in operation S100.

In operation S400, the placement server 400 may determine a location of the mobile base station based on locations of the terminals, determined in operation S300, to be connected to the mobile base station, for each of the at least one mobile base station. According to an embodiment, the placement server 400 may calculate a center value of the locations of the terminals to be connected to each mobile base station and temporarily determine a location corresponding to the calculated center value as a location of the mobile base station. According to an embodiment, the center value may be calculated by an equation provided below.

$$(\overline{x}_l, \overline{y}_l) = \left( \frac{1}{n_i} \sum_{k=1}^{n_i} x_{ik}, \frac{1}{n_i} \sum_{k=1}^{n_i} y_{ik} \right) \qquad \text{[Equation 1]}$$

Herein, $(\overline{x}_l, \overline{y}_l)$ indicates coordinates of a center value of an $i^{th}$ region, $n_i$ indicates the number of terminals included in the $i^{th}$ sub-region, and $(x_{ik}, y_{ik})$ indicates coordinates of a terminal k included in the $i^{th}$ region. Coordinates (x,y) may be relative coordinates with a location of a mobile base station of a current region as a zero point or may be absolute coordinates with a particular point in the coverage area as the zero point.

In operation S500, the placement server 400 may determine whether a location of any one of the at least one mobile base station is changed by operation S400.

When the location is not changed for every mobile base station, as a result of the determination, then the location of each mobile base station, determined in operation S400, may be determined as a final location of the mobile base station.

When the location of any one of the at least one mobile base station is changed, as a result of the determination, operations S300 and S400 may be repeated. That is, the placement server 400 may determine the terminals to be connected to each of the at least one mobile base station according to operation S300 and determine again the location of each mobile base station based on locations of the determined terminals to be connected according to operation S400.

When the location is not changed any longer for every mobile base station in a result of every iteration loop due to operation S500, the placement server 400 may determine the location as a final location of each mobile base station. This may be the same concept as no more change in a terminal connected to each mobile base station. That is, in operation S500, the placement server 400 may determine whether a terminal to be connected to each mobile base station is changed, instead of determining whether the location of each mobile base station is changed.

The method for determining a placement location of a mobile base station according to the first embodiment, proposed in FIG. 3, is simply based on a distance between a terminal and a mobile base station, in which the placement location may be determined almost in real time due to simple calculation.

On the other hand, the quality of communication between the terminal and the mobile base station may be proportional to a signal strength determined depending on the distance therebetween, but the signal strength may change with a surrounding environment as well as the distance between the terminal and the mobile base station. Thus, the quality of the service may be further improved by determining the location of the mobile base station based on the signal strength between the mobile base station and the terminal instead of the distance between the mobile base station and the terminal as in the method according to the first embodiment described above.

Thus, the present disclosure proposes a second embodiment for determining the placement location of the mobile base station, taking account of the signal strength as well as the distance between the terminal and the mobile base station.

Figure 5:
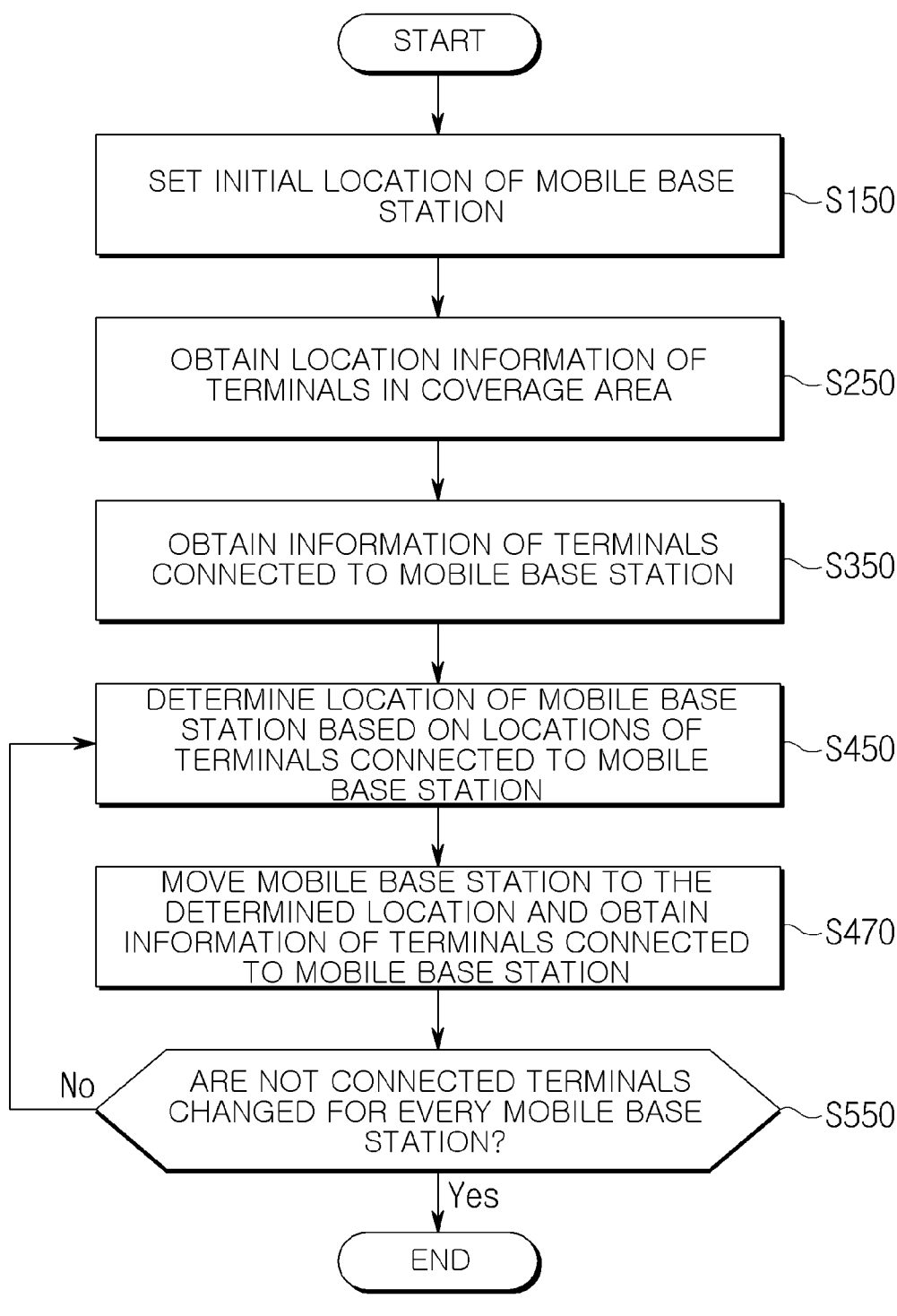
FIG. 5 is a flowchart of a second embodiment in which the placement server determines the location of the at least one mobile base station.

FIG. 5 is a flowchart of the second embodiment in which the placement server 400 determines the location of the at least one mobile base station 100*a* to 100*d*.

Referring to FIG. 5, in operation S150, an initial location of a mobile base station may be set. This operation is the same as operation S100 of FIG. 3 such that when a coverage area where a service is to be provided by the at least one mobile base station 100*a* to 100*d* has been determined, an initial location of the at least one mobile base station 100*a* to 100*d* may be set so that the at least one mobile base station 100*a* to 100*d* is at the same distance from each other within the coverage area. Alternatively, a random location in the coverage area may be set as the initial location of the at least one mobile base station 100*a* to 100*d*.

In the second embodiment, after setting an initial location of each mobile base station, the placement server 400 may instruct each of the at least one mobile base station 100*a* to 100*d* to move to the set initial location, and each mobile base station may move to the set initial location and provide a wireless communication service.

In operation S250, the placement server 400 may obtain location information of each of terminals in the coverage area where the service is to be provided by the at least one mobile base station 100*a* to 100*d*. According to an embodiment, the placement server 400 may obtain the location information of each terminals from the location server 300.

In operation S350, the placement server 400 may obtain the location information of terminals connected to each mobile base station. When each mobile base station initiates a service after moving to the set initial location according to an instruction of the placement server 400 in operation S150, a terminal may determine a base station to which the terminal is to be connected, according to a wireless communication standard protocol (e.g., an LTE standard protocol), attempt connection, connect to the determined mobile base station, and receive a wireless communication service.

The placement server 400 may obtain the information of the terminals connected to each mobile base station from the mobile base station or a terminal connection management entity (e.g., a mobility management entity (MME)) on a core network.

In operation S450, the placement server 400 may determine a placement location of the mobile base station based on the information, obtained in operation S350, of the terminals connected to the mobile base station, for each of the at least one mobile base station. According to an embodiment, the placement server 400 may calculate a center value of the locations of the terminals connected to each mobile base station and temporarily determine a location corresponding to the calculated center value as a location of the mobile base station.

In operation S470, the placement server 400 may instruct each of the at least one mobile base station to move to the location temporarily determined in operation S450, and obtain again the information of the terminals connected to the mobile base station from the mobile base station or the terminal connection management entity, after the mobile base station moves to the determined location.

When the mobile base station moves to the location temporarily determined in operation S450, the terminal may hand over from a currently connected mobile base station to another mobile base station based on a signal strength coming from the at least one mobile base station, according to a wireless communication standard protocol. Thus, when every mobile base station moves to a temporarily determined location, the terminal may change a base station to which the terminal is to be connected for a wireless communication service, based on a signal strength with the mobile base station.

In operation S550, the placement server 400 may determine whether the terminals connected to each mobile base station are changed, after the mobile base station actually moves to the temporarily determined location in operation S470. That is, the placement server 400 may obtain the information of the terminals connected to the mobile base station after movement of the mobile base station according to operation S470, and determine whether the connected terminals are changed for every mobile base station.

When the connected tem finals are not changed for every base station, as a result of the determination, the placement server 400 may determine the location as a final placement location and terminate a placement operation.

When the connected terminals are changed for the at least one mobile base station, as a result of the determination, operations S450 and S470 may be repeated.

According to an embodiment, when the placement server 400 determines whether the connected terminals are changed for the at least one mobile base station in operation S550, a terminal entering an idle state after disconnecting from a mobile base station due to no need for further data transmission or a terminal having location information that changes by a preset level or more may not be subject to the determination. That is, when a terminal is changed for the aforementioned reasons, the terminal may be regarded as not changed. In the second embodiment of FIG. 5, the placement location is determined while actually providing the service to the terminal, such that the terminal may enter the idle state or hand over to another mobile base station due to a general operation of the mobile terminal. Since the location of the mobile base station may be changed repeatedly indefinitely when this exceptional situation is tolerated, the placement server 400 may perform the above-described determination without including such exceptional terminals.

When the location is not changed any longer for every mobile base station in a result of every iteration loop due to operation S550, the placement server 400 may determine the location as a final location of each mobile base station.

In the second embodiment of FIG. 5, there is also a possibility that many terminals are connected to one mobile base station. In this case, a mobile base station to which many terminals are connected may suffer from capacity insufficiency. This degrades the entire service quality, making it necessary to prevent many terminals from being connected to one mobile base station. In a way to prevent this problem, the number of terminals connectable to each mobile base station may be limited to a specific value. When the limited value is exceeded, the mobile base station may transmit a message requesting connection to another base station to the terminal without approving a connection request or a handover request coming from the terminal. In another embodiment, the mobile base station may reduce a strength of a signal received by a terminal in an edge by adjusting base station output to allow the terminal in the edge to be connected to another mobile base station, thereby controlling the number of terminals to be connected.

According to the first embodiment of FIG. 3 or the second embodiment of FIG. 5, the placement server 400 may determine a placement location of at least one mobile base station in real time and move the at least one mobile base station, thereby improving the quality of a wireless communication service.

According to various embodiments, the first embodiment of FIG. 3 or the second embodiment of FIG. 5 may be periodically repeated at specific time intervals. Alternatively, when an average signal strength of terminals connected to one mobile base station is less than a specific value or an average distance of the terminals connected to one mobile base station is greater than a specific value, then the first embodiment of FIG. 3 or the second embodiment of FIG. 5 may be performed.

In the foregoing description, it is disclosed that the method of the first embodiment of FIG. 3 and the method of the second embodiment of FIG. 5 is performed by the placement server 400, but this merely accords with an embodiment, and according to another embodiment, the method of the first embodiment of FIG. 3 and the method of the second embodiment of FIG. 5 may be performed in one of the at least one mobile base station. Alternatively, the method of the first embodiment of FIG. 3 and the method of the second embodiment of FIG. 5 may be performed by an entity in a core network.

As described above, the present disclosure proposes a method for determining a placement location of a mobile base station to improve the entire service quality by using mobility of the mobile base station. By using this method, the mobile base station may provide voice and/or data communication of a better quality to users in the event of a military operation or disaster.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, the term "module" or "unit" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, the above-described components may be implemented as a computer program and realized in a placement server or a mobile base station.

According to various embodiments, the implemented computer program may be stored in a computer-readable storage medium.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a mobile base station proposed in the present disclosure is placed in the most efficient location, thereby improving the performance of the entire system and providing a better service to terminals.

In addition, effects obtainable in the disclosure are not limited to the effects as described above, and other effects not described above will become apparent to those skilled in the art from the following detailed description.

What is claimed is:

1. A method for determining placement locations of base stations, the method comprising:
(a) setting a coverage area in which a wireless communication service is provided by the base stations;
(b) setting an initial locations of the base stations in the coverage area;
(c) obtaining location information of terminals in the coverage area;
(d) determining terminals to be connected to each of the base stations;
(e) determining locations of each of the base stations based on locations of the determined terminals to be connected;
(f) determining whether the determined location is changed from a previous location for every one of the base stations; and
(g) repeating (d), (e), and (f) when the determined location is changed from the previous location for any one of the base stations, as a result of the determining, and determining the determined location as a placement location of each of the base stations when the determined location is not changed from the previous location for every one of the base stations, as a result of the determining.

2. The method of claim 1, wherein the setting of the initial locations of the base stations in the coverage area comprises:
dividing the coverage area into as many regions as a number of the base stations, the regions having a same size; and
setting the initial locations of the base stations to a center of each of regions.

3. The method of claim 1, wherein the setting of the initial locations of the in the coverage area comprises:
dividing the coverage area into as many regions as a number of the base stations, the regions having a same size; and
setting the initial locations of the base stations to a location of one of terminals included in each of the regions.

4. The method of claim 1, wherein the determining of the terminals to be connected to each of the base stations comprises determining a mobile base station located closest to each terminal as a mobile base station to which the terminal is to be connected, based on the location of the at least one mobile base station.

5. The method of claim 1, wherein the determining of the location of each of the base stations based on the locations of the determined terminals to be connected comprises:

calculating a center value of the locations of the determined terminals to be connected, for each of the base stations; and determining a location corresponding to the calculated center value as the location of each of the base stations.

6. A non-transitory computer-readable storage medium having stored therein a computer program implemented to operate, when executed by a computer or a server, according to the method of claim 1.

7. A method for determining a placement location of base stations, the method comprising:

(a) setting a coverage area in which a wireless communication service is provided by the base stations;

(b) setting initial locations of the base stations in the coverage area;

(c) obtaining location information of terminals in the coverage area;

(d) moving the base stations to the initial locations and obtaining information of terminals connected to each of the base stations;

(e) determining a location of each of the base stations based on locations of the connected terminals;

(f) moving the base stations to the determined locations and obtaining information of the connected terminals for each of the base stations;

(g) determining whether the connected terminals are changed for each of the base stations; and (h) repeating (e), (f), and (g) when the connected terminals are changed compared to before for any one of the at least one mobile base station, as a result of the determining, and determining the determined location as a placement location of each of the base stations when the connected terminals are not changed compared to before for every one of the base stations, as a result of the determining.

8. The method of claim 7, wherein the setting of the initial locations of the base stations in the coverage area comprises:

dividing the coverage area into as many regions as a number of the base stations, the regions having a same size; and setting the initial locations of the base stations to a center of each of the regions.

9. The method of claim 7, wherein the setting of the initial locations of the base stations in the coverage area comprises:

dividing the coverage area into as many regions as a number of the base stations, the regions having a same size; and setting the initial locations of the base stations to a location of one of terminals included in the region.

10. The method of claim 7, wherein the determining of the location of each of the base stations based on the locations of the determined terminals to be connected comprises:

calculating a center value of the locations of the determined terminals to be connected, for each of the base stations; and determining a location corresponding to the calculated center value as the location of each of the base stations.

11. The method of claim 7, wherein the determining of whether the connected terminals are changed for each of the base stations comprises determining whether the connected terminals, except for a terminal entering an idle state after disconnecting from one of the base stations and/or a terminal having location information that changes by a preset distance or more, are changed for each of the base stations.

* * * * *